United States Patent [19]

Butler et al.

[11] Patent Number: 4,586,738
[45] Date of Patent: May 6, 1986

[54] MOLDED PLASTIC BUMPER AND MOUNTING BRACKET ASSEMBLY

[75] Inventors: Gary M. Butler, Pontiac; Frank J. Bakewicz, Grosse Point Woods, both of Mich.

[73] Assignee: General Motors Corporation, Detroit, Mich.

[21] Appl. No.: 691,462

[22] Filed: Jan. 14, 1985

[51] Int. Cl.$^4$ .............................................. B60R 19/02
[52] U.S. Cl. ..................................... 293/107; 293/122
[58] Field of Search ............... 293/107, 120, 121, 122, 293/132, 133, 134, 155

[56] References Cited

U.S. PATENT DOCUMENTS

| | | | |
|---|---|---|---|
| 3,129,014 | 4/1964 | Hutchison | 280/5 R |
| 3,330,439 | 7/1967 | Moorman | 220/86 R |
| 3,552,599 | 1/1971 | Redding | 220/72 |
| 3,764,174 | 10/1973 | Taninecz | 293/107 |
| 3,829,141 | 8/1974 | Igwe | 293/122 |
| 4,088,357 | 5/1978 | Klie et al. | 293/120 |
| 4,241,949 | 12/1980 | Huber et al. | 293/120 |
| 4,488,745 | 12/1984 | Stokes | 293/122 |

FOREIGN PATENT DOCUMENTS 353289  7/1931  United Kingdom .

*Primary Examiner*—Robert R. Song
*Attorney, Agent, or Firm*—Charles R. White

[57] ABSTRACT

A unitized bumper assembly for direct attachment to support structure within a vehicle comprising an elongated resilient blow molded hollow shell with continuous walls made from thermoplastic material to predetermined width and height and forming an air-tight cell. The assembly has laterally spaced bracket means encapsulated in said inner face during blow molding which accommodates fastener means for connection of said shell to a vehicle whereby a load of predetermined magnitude to said shell between said brackets is dissipated by the inward deflection of said shell as a deflecting beam.

3 Claims, 5 Drawing Figures

MOLDED PLASTIC BUMPER AND MOUNTING BRACKET ASSEMBLY

This invention relates to bumpers for vehicles and more particularly to a unitized blow molded plastic bumper with metallic brackets encapsulated thereto for direct attachment to support structure in the vehicle.

Prior to the present invention, lightweight thermoplastic bumpers have been developed for vehicle application to provide effective low speed impact protection. Such bumpers may be made from a fascia, U-shaped in cross-section, and a rear reinforcing back beam separately injection molded from thermoplastic material using heavy duty presses. After injection molding, the shell and beam are mounted in a vibration welder so that the side edges of the beam frictionally engage the inner walls of the shell. While a clamping force is applied, these parts are relatively reciprocated until the interface of the parts becomes molten and intermixes. After sufficient intermixing, vibrations are terminated so that the interface cools and solidifies to weld the parts together into a four-sided box beam. The clamping force is removed and the welded bumper is removed from the vibration welder. The bumper is then provided with suitable fasteners for attachment to the vehicle. While such bumpers have proven effective, their manufacturing equipment and manufacture are relatively costly and complex. Furthermore, the bumper does not form a closed cell energy asorbing unit and the elongated weld joining the parts is subject to degradation by impacts and by protracted use. Such prior bumpers do not meet higher standard required of newer vehicles in which design, engineering and manufacturing assembly and material handling are fully integrated.

In contrast to such prior art hollow bumpers, the present invention meets these higher standards and is drawn to a lightweight one-piece, blow-molded hollow bumper which can be readily formed into a closed cell unit using low pressure "shop" air, 100 psi for example. In this bumper assembly, special metallic brackets for securing the bumper to the vehicle are directly encapsulated or embedded into the back wall of the bumper during the molding process. The forward or outer wall of the bumper provides a fascia and, if desired, incorporates an air dam. The front and rear walls converge on each other to rearwardly swept left and right side terminal ends to protect the corners of the vehicle to which the bumper is attached. The brackets directly mount the bumper to support structure in the vehicle so that the bumper acts as a beam that can deflect under center type impact loads to dissipate impact energy with high efficiency. Elastic properties of the engineering thermoplastic preferably used as the bumper material of this invention promote return of the bumper beam to its original position to protect vehicle bodywork. If impact loading is near the support bracket, the cross-section of the beam can collapse to effectively absorb impact energy. With this invention, no attachment openings are made in the walls of the bumper so that the interior provides a closed pocket for a pneumatic or viscous fluid added therein whose pressure can increase when the bumper is deflected under load and cell volume decreases. This provides an additional spring for storing energy and restoring the bumper to its original preimpact geometry. Vent holes or blow out plugs can be utilized to control the escape of fluid from the interior pocket and thereby tailor the energy absorbing characteristics of the bumper.

These and other features, objects and advantages of the present invention will become more apparent from the following detailed description and drawing in which.

Figure 1:
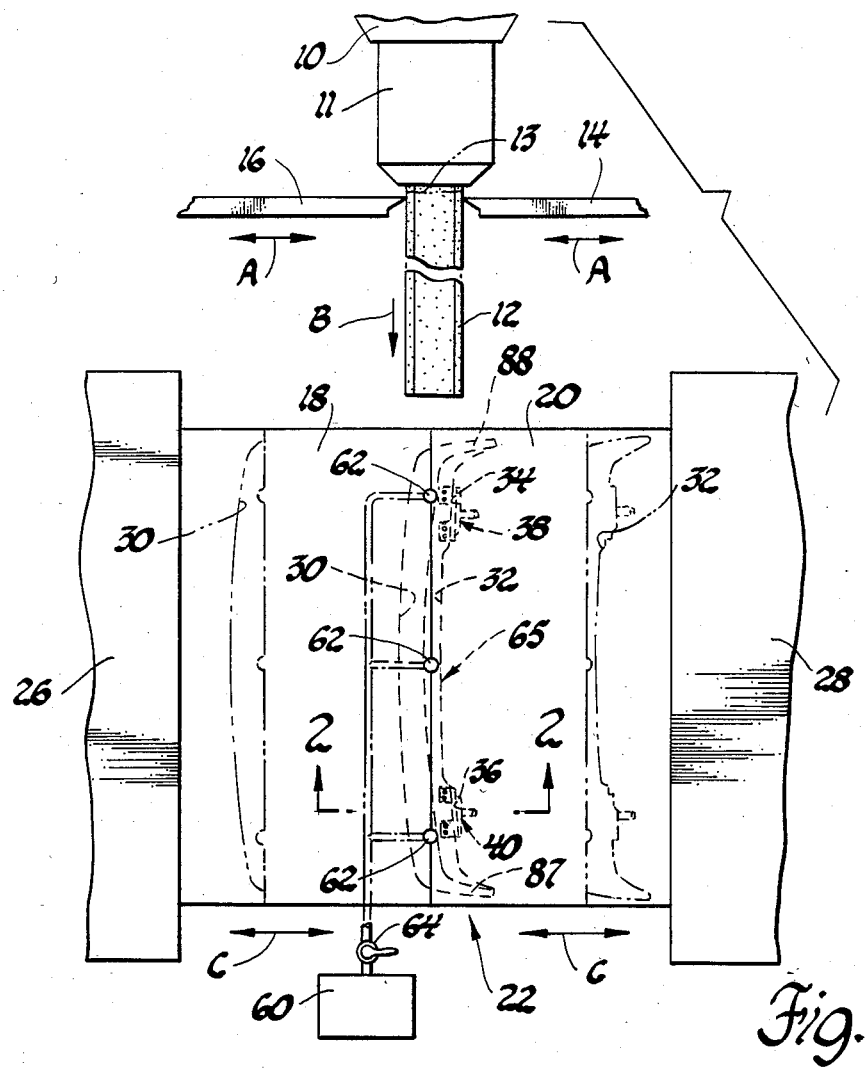
FIG. 1 is a diagrammatic plan view illustrating the blow-mold manufacture of the bumper assembly of this invention.

Turning now in greater detail to FIG. 1 of the drawing, there is diagramatically disclosed a conventional extruder 10 which extrudes through a die head 11, a hot cylinder of low density polyethylene or other suitable plastic material forming parison 12. The parison 12 is severed at line 13 by action of carrier and cutter knives 14 and 16 operated by conventional machinery, not illustrated. The lateral movement of the knives toward and away from each other is indicated by arrows A. These knives further grip the parison and rapidly move downwardly as shown by arrow B into a molding position. In this position, the halves 18 and 20 of the mold 22 are open as illustrated by the dashed lines. The mold halves are then moved laterally toward one another as indicated by arrows C, by conventional press platens 26 and 28. These halves of the mold have bumper forming cavities 30, 32 therein which, when brought together, form the styled outer configuration of the blow molded bumper.

Figure 2:
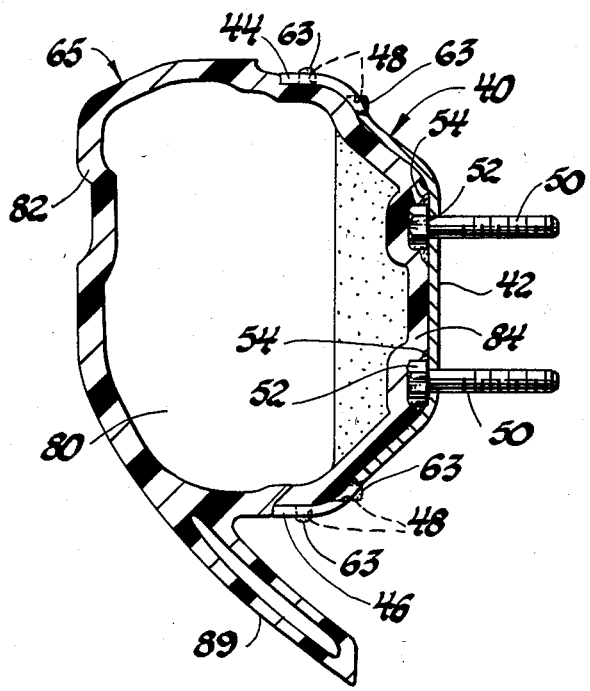
FIG. 2 is a cross-sectional view of a blow molded bumper assembly of this invention taken generally along the line 2—2 of FIG. 1 after molding and with the molds not shown.
Figure 4:
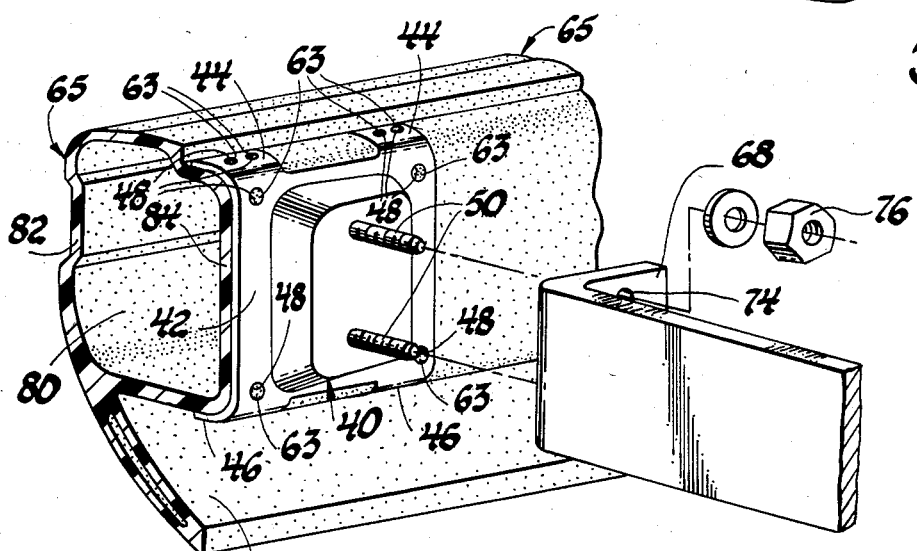
FIG. 4 is an isometric view of a portion of the blow molded bumper assembly of FIG. 3 showing the interior pocket of the bumper and a bracket assembly captured by the bumper, during molding.

The mold half 20 has laterally spaced recesses 34, 36 therein in which bumper mounting brackets 38 and 40 are installed just prior to molding. Each bracket has a vertical base or wall 42 formed with laterally-spaced upper and lower ears 44, 46 which are vertically aligned and extend outwardly to fit around the shouldered inner wall of the bumper as shown in FIGS. 2 and 4. The ears and vertical walls have attachment holes 48 formed therein to accommodate the flow of heated thermoplastic material therethrough as further explained below. Bumper mounting bolts 50 extend from the vertical base and have their heads 52 metal welded at 54 to the interior surfaces thereof.

With the heated parison, moved into the mold and the mold closed, 100 psi or other selected low pressure air is supplied from pressure chamber 60 through openings 62 in the mold when the valve 64 is opened. With low pressure air fed by conventional blow pins into the interior of the parison, the heated walls thereof expand to contact the mold walls and fill out the cavity. Furthermore, as shown in FIGS. 2 and 4 the hot material of the parison encapsulates the brackets and flows into the attachment holes to form buttons 63 to secure the bumper assembly to the bracket.

After sufficient cooling, the mold halves are moved to the open position and the closed cell blow molded bumper assembly 65 is removed from the mold. This readys the mold for installation of new brackets and for the supply of a new heated parison from the die head of extruder 10. The bumper assembly 65 is affixed to the ends 68 of the vehicle side rails with the threaded ends of bolts 50 being received through the bolt holes 74 formed therein. Nuts 76 threaded on the inside of the bolts secure the brackets and the bumper assembly to the ends of the side rail. The blow-molded bumper portion of this assembly forms a closed cell 80 with front and rear walls 82, 84 which extend laterally across the vehicle 86, FIG. 5, and which sweep rearwardly at left and right terminal ends 87, 88 to protect the corners of the vehicle. If desired, an air dam 89 can be molded as an integral part of the bumper.

Figure 3:
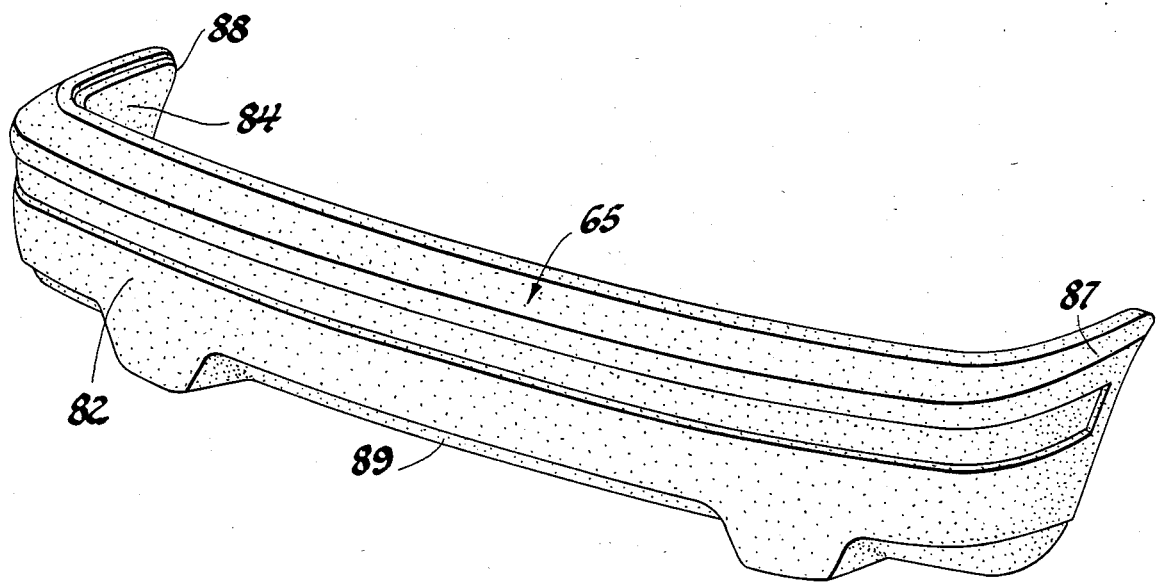
FIG. 3 is an isometric view showing the outer shell portion of the blow mold bumper assembly of this invention.
Figure 5:
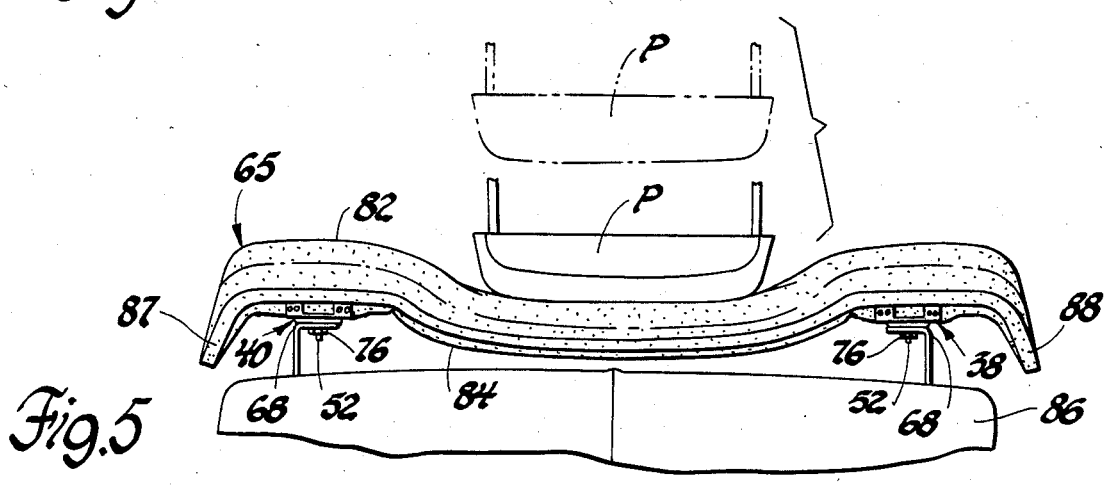
FIG. 5 is a diagrammatic plan view of the bumper assembly of this invention mounted to a vehicle and deflected by a pendulum load to illustrate the energy absorbing capability of this bumper.

FIG. 5 illustrates action of the bumper with an impact pendulum P striking the center area of the bumper to represent a five mile per hour impact. Under such conditions, the bumper acts as a deflecting beam with the walls of the center portion stretched to effectively dissipate the energy of the impact without damage to vehicle 86. After removal of the impact load, the bumper recovers at a predetermined recovery rate to its original position such as shown in FIG. 3. If desired, bleed holes or blow-out plugs can be provided in the bumper walls leading to the interior of the bumper to meter the escape of air or subsequently added viscous fluid from the closed cell of the bumper to thereby provide tailoring of energy absorbing characteristics. In addition to energy management by beam deflection under the impact load, energy is managed by section deflection in which the cross-section of the bumper beam in front of the brackets 38, 40 collapses under the impact load directed toward the brackets. A third mode of energy management is by fluid compression, in which the volume of the closed cell decreases from the deflecting modes causing an increase in internal pressure. This pressure change effectively adds an additional energy storage spring into the energy management system. The elastic properties of the bumper material and the internal pressure of the cell preferably promote a quick but controlled recovery of the bumper to the original preimpact geometry.

The contribution of each mode of energy absorption varies depending on the impact location. The section deflection mode dominates for impact occurring near or over the mounting points. The beam deflection mode predominates in centerline impacts such as shown in FIG. 5. The fluid deflection mode is a secondary energy management method which occurs in conjunction with both beam deflection and section deflection modes. Accordingly, methods to tailor the bumper to a given application include closed cell section size, section wall thickness, air orifice size and the use of a filler material, if desired. With filler material, the air in this cell can be replaced by particles of lightweight material to obtain different energy absorbing characteristics. Also by using foams or liquids of various densities in the cell, the stiffness of this bumper can be selected to meet energy absorption and vehicle protection requirements.

While a preferred embodiment of the invention has been shown and described, other embodiments will become apparent to those skilled in the art. Accordingly, the scope of this invention is set forth in the following claims.

The embodiments of the invention in which an exclusive property or priviledge is claimed are defined as follows:

1. A unitized lightweight bumper assembly for direct attachment to laterally spaced support structures of a vehicle having vehicle body work comprising an elongated resilient and jointless hollow shell with continuous and uninterrupted walls blow molded from homogeneous thermoplastic material to predetermined width and height, said hollow shell forming at least one closed cell and having outer and inner faces spaced from one another by top and bottom wall means, laterally spaced metallic bracket means directly contacting and directly attached to said inner face, and fastener means associated with said bracket means for connection of said shell as a bumper beam to said laterally spaced support structure of said vehicle and outwardly of said body work whereby a load of predetermined magnitude to said shell between said brackets is dissipated by the inward beam deflection of a portion of said entire shell between said bracket means toward the bodywork of said vehicle and wherein said deflected portion of said entire shell recovers to its normal undeflected position after removal of said load, said bumper being adapted to energy of a load directed to a section of said outer face thereof substantially in line with at least one said bracket means by deflection of said section of said outer face relative to said inner face and toward said one of said bracket means.

2. A unitized lightweight bumper assembly for direct attachment to a laterally spaced support structure within a vehicle having vehicle body work comprising an elongated resilient and jointless hollow shell with continuous walls blow molded from thermoplastic material to predetermined width and height, said hollow shell forming a continuous closed cell having outer and inner faces spaced from one another by top and bottom wall means, laterally spaced bracket means captured and held directly to said inner face by the thermoplastic material of said shell, and fastener means associated with said bracket mean for connection of said shell to said support structure within said vehicle and outwardly of said vehicle body work, whereby a load of predetermined magnitude to said shell between said brackets is dissipated by the inward beam deflection of an entire centralized portion of said shell toward the bodywork of said vehicle to stretch outer and inner walls of said shell to dissipate impact energy and wherein said deflected centralized portion naturally recovers to its undeflected state upon removal of said impact load, said outer face being deflectable relative to said inner face in response to the application of a load directed on said outer face toward at least one of said bracket means, said closed cell having a compressible fluid therein which provides springs for storing energy when said shell is deflected and for returning said shell to its original preimpact position.

3. A unitized bumper lightweight assembly for direct attachment to support structure withn a vehicle and outwardly of body work of said vehicle comprising an elongated resilient hollow shell with continuous uninterrupted walls with closed angular extending opposite ends to protect said body work, said shell being blow molded from thermoplastic material to predetermined width and height, said hollow shell forming a resilient cell having outer and inner faces spaced one another by top and bottom wal means, laterally spaced bracket means interlocked directly with said inner face, and fastener means associated with said bracket means for connection of said shell by said bracket means to said support structure whereby a load of predetermined magnitude to a central portion of said shell between said brackets is dissipated by the inward deflection of said shell as a deflecting beam toward the bodywork of said vehicle and wherein said deflected central portion of said shell naturally recovers to its original undeflected state upon removal of said load, said outer face being deflectable relative to said inner face in response to the application of another load directed onto said outer face toward at least one of said bracket means to dissipate the energy of said last-mentioned load and recoverable to its original undeflected state or removal of said last-mentioned load.

* * * * *